Jan. 30, 1940. J. I. HAMM Re. 21,337

DOOR WEATHER STRIP

Original Filed Nov. 26, 1935

INVENTOR
James I. Hamm
BY
Wooster & Davis
ATTORNEYS.

Reissued Jan. 30, 1940 Re. 21,337

UNITED STATES PATENT OFFICE 21,337

DOOR WEATHER STRIP

James I. Hamm, Fairfield, Conn., assignor, by mesne assignments, to Bridgeport Fabrics, Inc., Bridgeport, Conn., a corporation of Connecticut Original No. 2,043,700, dated June 9, 1936, Serial No. 51,611, November 26, 1935. Application for reissue August 25, 1939, Serial No. 291,951

14 Claims. (Cl. 20—69)

This invention relates to new and useful improvements in a finishing molding or weatherstrip particularly adapted for automobile doors, although not necessarily limited to such use. It is common practice at the present time to use a weatherstrip about automobile doors at the inner side thereof comprising a rubber or fibrous core enclosed in a woven fabric covering which is sewed along one side of the tube to leave a tacking strip for fastening it to the sides of the door opening. This, however, after being used for a time tends to move away from the door so that it no longer makes a tight contact therewith.

It is therefore an object of the present invention to so construct the weatherstrip that it has a spring hinge effect so that it automatically tends to press against the surface of the door to make what may be called a pressure seal and will do this indefinitely and after continued use so that the desired seal about the door will be maintained indefinitely and under continued use.

Other objects and advantages will become apparent from the following detailed description taken in connection with the accompanying drawing. However, it will be understood that the invention is not confined to the details disclosed but includes such variations and modifications as fall within the spirit of the invention.

Figure 1:
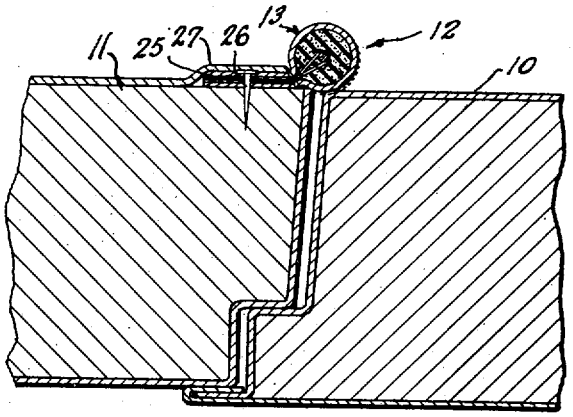
Fig. 1 is a detail section indicating my improved weatherstrip as applied to an automobile door.

In Fig. 1 I have shown merely diagrammatically at 10 one edge portion of an automobile door and the door post or frame at 11. My improved weatherstrip indicated as a whole by 12 is secured to the frame 11 about the door opening with the enlarged bead portion 13 overhanging the edge of the door opening so as to engage the inner surface of the door to cover and seal the joint or crack between the edge of the door and the door opening.

This improved weather or sealing strip is composed of a resilient stiffening strip 14 on one edge of which is a yieldable resilient core 15, and this core is covered by a woven fabric covering 16 which encloses the core and extends on opposite sides of the stiffening strip 14 as indicated at 17 and 18. This core is preferably of sponge rubber as this material is soft and resilient and maintains its shape indefinitely, although other suitable materials may be used. This fabric covering may be of any plain or fancy weave as desired to correspond with the interior finish or upholstery of the car, and it may be secured to the strip 14 and the core 15 either by a layer of cement about the core and on opposite sides of the strip 14, or it may be secured to these elements by stitching as indicated at 19, or if preferred both the stitching and the cement may be used.

The strip 14 is not only a stiffening strip but it has a resilient spring action, so that although it may permit the enlarged portion 13 of the strip to yield inwardly from pressure of the door it still tends to move outwardly against the door so that when the pressure is released it moves back to its original position. It therefore also presses with resilient action against the surface of the door to always maintain the seal and provide what is in effect a pressure seal to effectively prevent entrance of cold air around the door.

Figure 4:
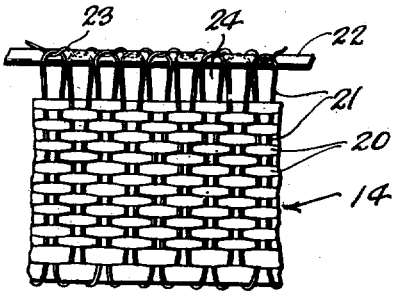
Fig. 4 is a side elevation of a portion of the stiffening member.

This strip 14 is a woven wire fabric and is woven with warps 20 of suitable fibrous threads such as cotton or linen and with a filling or weft 21 of a special temper spring wire. This is preferably of rather fine wire but with sufficient temper and stiffness that it maintains its original position, and after being bent or forced to one side will return to its original position as soon as the pressure is removed. As will be seen from Fig. 4 the wire filling or weft strands 21 extend over and back under the same pick which gives two wires in the same pick, so that I get double the amount of wires to the inch of fabric over a fabric where there is only one wire to a pick. In other words the wire forms the filling in the fabric with the wire passing through the warp twice on each shed of the warp, laying two wires together to increase the efficiency of the springiness of the wire. This gives a stronger stiffening strip and one which has greater holding effect for a given size of wire so that a finer wire can be used. Along one edge is a bead 22 preferably of any suitable fiber, which is secured to the wire weft strands by a separate thread 23 passing through the looped ends of the wire, or if preferred the wire strands may be looped over this bead. This assists in securing to the stiffening strip the yieldable core 15.

Figure 2:
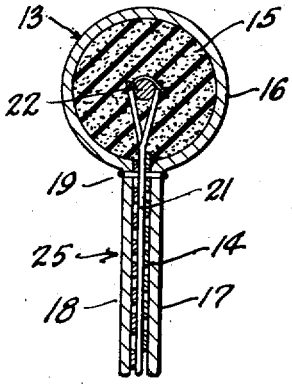
Fig. 2 is a transverse section of the weatherstrip on an enlarged scale.
Figure 3:
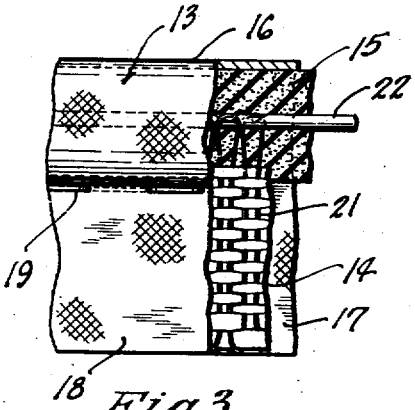
Fig. 3 is a partial side elevation and a partial section of the strip.

This yieldable core 15 is preferably of sponge rubber so that it is soft and yielding and still maintains its life and resiliency and therefore its original shape indefinitely. It may be formed by taking a rod of sponge rubber of any desired shape, preferably either round or oval, and slitting it longitudinally along one side and inserting the edge of the strip 14 into this cut as shown in Fig. 2, with the bead 22 preferably at about the center of the sponge rubber core, and then pressing the sides of the core against the sides of the stiffening strip. The fresh cut surfaces of the sponge rubber comes together and engage through the openings 24 between the wires of the weft so that they adhere to each other and make a substantially solid core about the edge of the strip, or if preferred, the sponge rubber material may be molded in position about the edge of the strip and vulcanized while in this position, making a still more unitary construction. Then the covering 16 of woven fabric may be applied to enclose the core and the exposed portion of the strip 14 either by cementing it or sewing it thereto or both, as above described, thus completing the weatherstrip, which may be applied to the door opening as desired. This may be done by either cementing the portion 25 at one side of the enlarged portion 13 to the surface surrounding the door opening or by tacking it thereto as indicated at 26. Then this may be covered with the usual interior upholstery or finish 27 to complete the interior finish.

Figure 5:
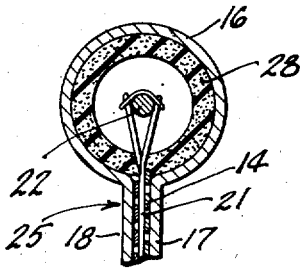
Fig. 5 is a section similar to Fig. 2 showing a slightly modified construction.

Fig. 5 shows a slight modification in which instead of using the solid sponge rubber core 15 I may use a rubber tube 28. This can be applied by slitting it longitudinally along one side and then inserting the edge of the strip 14 as indicated, and enclosing the strip 14 and the tube in the woven fabric covering 16 the same as in the first form. It will be understood that although I have shown the core as substantially circular in cross section it may be of other desired shapes, such for example as oval or any other suitable shape.

It will be apparent from the above that this weatherstrip construction combines the best features of the rubber tubing or sponge rubber core covered with a woven cloth fabric with the improved effect of a woven resilient wire fabric which is so combined with this core as to form in effect a spring hinge, and which always holds the weatherstrip positively against the door to maintain the proper seal, and this will maintain this action and effect indefinitely under continued use.

Having thus set forth the nature of my invention, what I claim is:

1. A weather strip of the character described comprising a woven attaching strip including a yieldable resilient wire extending transversely of said strip, a soft resilient core secured along one edge of said strip, and a woven finishing fabric enclosing said core and secured to said strip.

2. A weather strip of the character described comprising a woven attaching strip including a yieldable resilient wire woven transversely therein to stiffen the strip, an enlarged core member extending along one edge of the strip, and a finishing woven fabric enclosing the core and strip.

3. A weather strip of the character described comprising a woven attaching strip including a yieldable resilient stiffening wire woven transversely in the strip, an enlarged core of sponge rubber embracing one edge of the strip, and a finishing woven fabric enclosing the core and strip.

4. A weather strip of the character described comprising a woven stiffening strip having wefts of a tempered spring wire, a core of sponge rubber extending along and embracing one edge of the strip, and a fabric finishing covering enclosing the core and strip.

5. A weather strip of the character described comprising a woven stiffening strip of fibre warp and tempered spring wire weft, a resilient rubber core secured to one edge of the stiffening strip, and a fabric finishing covering enclosing the core and strip.

6. A weather strip of the character described comprising a woven stiffening strip including cross members of tempered spring wire, and an enlarged bead of yieldable resilient material extending along one edge of said strip, said cross members extending into the bead.

7. A weather strip of the character described comprising a stiffening strip of fibre warp threads and spring wire weft woven therewith, said wire weft extending beyond the warp at one side to form open loops, a sponge rubber core along one edge of the strip embracing and filling said loops, and a fabric finishing covering embracing the core and strip.

8. A stiffening strip for a weather strip comprising a woven fabric having fibre warps and tempered spring wire weft members, and the wire weft members extending through the warp twice on each shed of the warp.

9. A weather strip of the character described comprising a woven stiffening strip including fibre warps and weft members of resilient spring wire, and an enlarged bead of sponge rubber extending along one edge with the resilient weft members extending into the bead.

10. A stiffening strip for a weather strip comprising a woven fabric having fibre warps and fine tempered spring wire weft members, and the wire weft members extending through the warp twice on each shed of the warp and having sufficient resiliency to return the stiffening strip to an original position when bent or forced therefrom, upon the force being removed.

11. A stiffening strip for a weather strip comprising a woven fabric having fibre warps and tempered spring wire weft members, and the wire weft members extending through the warp twice on each shed of the warp and connected at an end thereof to form an open loop with the end of the loop projecting from an edge of the strip, said portion of the loop passing through the strip being compressed and constricted by the warp to a width less than the width at the outer end thereof.

12. A weather strip of the character described comprising a woven stiffening strip including cross members of tempered spring wire arranged in pairs in the woven strip and connected at one end thereof to form an open loop with the end of the loop projecting from the edge of the strip, the portion of the loop passing through the strip being compressed by the strip as it passes therethrough, and an enlarged bead of yieldable resilient material extending along one edge of the strip and having the looped cross members extending therein.

13. A weather strip of the character described comprising a woven stiffening strip including a fibre warp and weft members of resilient spring wire, an enlarged bead of sponge rubber extending along one edge of the stiffening strip with the resilient weft members extending into the bead, said resilient weft members normally having sufficient temper and stiffness to maintain the bead in an original position and return the bead to said original position as soon as pressure is removed after being bent or forced to one side.

14. A weather strip of the character described comprising a woven stiffening strip including a fibre warp and weft members of resilient spring wire, the wire of the weft members extending through the warp twice on each shed of the warp and beyond the warp at one side to form open loops; and an enlarged bead of sponge rubber extending along one edge of the stiffening strip with the loops of the resilient weft members extending into the bead, the sponge rubber embracing and filling said loops, the wire of the weft members being sufficiently resilient to yield to permit the bead to be held in sealing relation when pressure is applied thereto and to return the bead to its normal position when pressure is relieved therefrom.

JAMES I. HAMM.